United States Patent [19]
Sloan et al.

[11] 3,731,390
[45] May 8, 1973

[54] LAYEROUT GAUGE

[76] Inventors: John L. Sloan, 1669 Loma Avenue, Long Beach, Calif. 90804; Palmer B. Peters, 2825 Knode Street, Torrance, Calif. 90501

[22] Filed: Nov. 1, 1971

[21] Appl. No.: 194,720

[52] U.S. Cl. ................................................33/189
[51] Int. Cl. ..........................B23b 49/02, G01b 5/14
[58] Field of Search ............................33/189, 174 G

[56] References Cited

UNITED STATES PATENTS

| | | | |
|---|---|---|---|
| 1,046,187 | 12/1912 | Hernlund | 33/189 X |
| 1,725,476 | 8/1929 | Poppock | 33/189 |
| 1,826,807 | 10/1931 | McDanel | 33/189 X |

*Primary Examiner*—Louis R. Prince
*Assistant Examiner*—Charles E. Phillips
*Attorney*—John Holtrichter, Jr.

[57] ABSTRACT

A tool for use by structural steel layerout men which allows the simultaneous marking of beam shear lines and hole positions in both the flange and web of the beam, the tool including a unitary broad strip frame member formed with a flat web portion to lie adjacent the beam's web and a U-shaped flange portion fitted over the beam's flange, the web portion and a flange portion mounted movable flange gauge strip both include a plurality of gauge slots for respectively laying out the web and flange of a structural beam while shear lines perpendicular to the elongate outer surface of the beam's flange may be marked off on the beam's web along the parallel side edges of the web portion of the tool.

8 Claims, 4 Drawing Figures

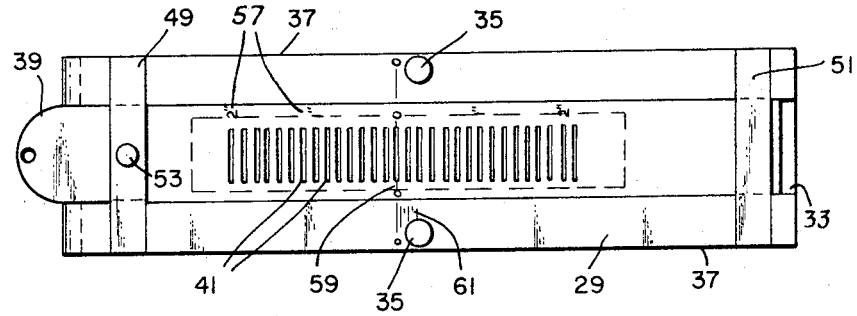
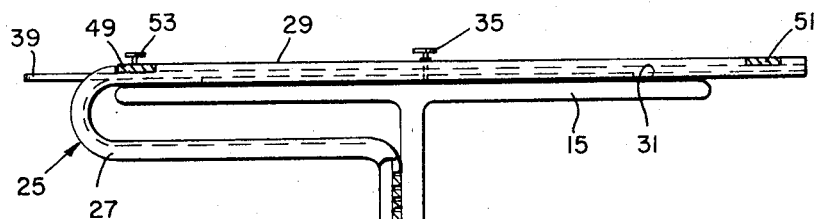
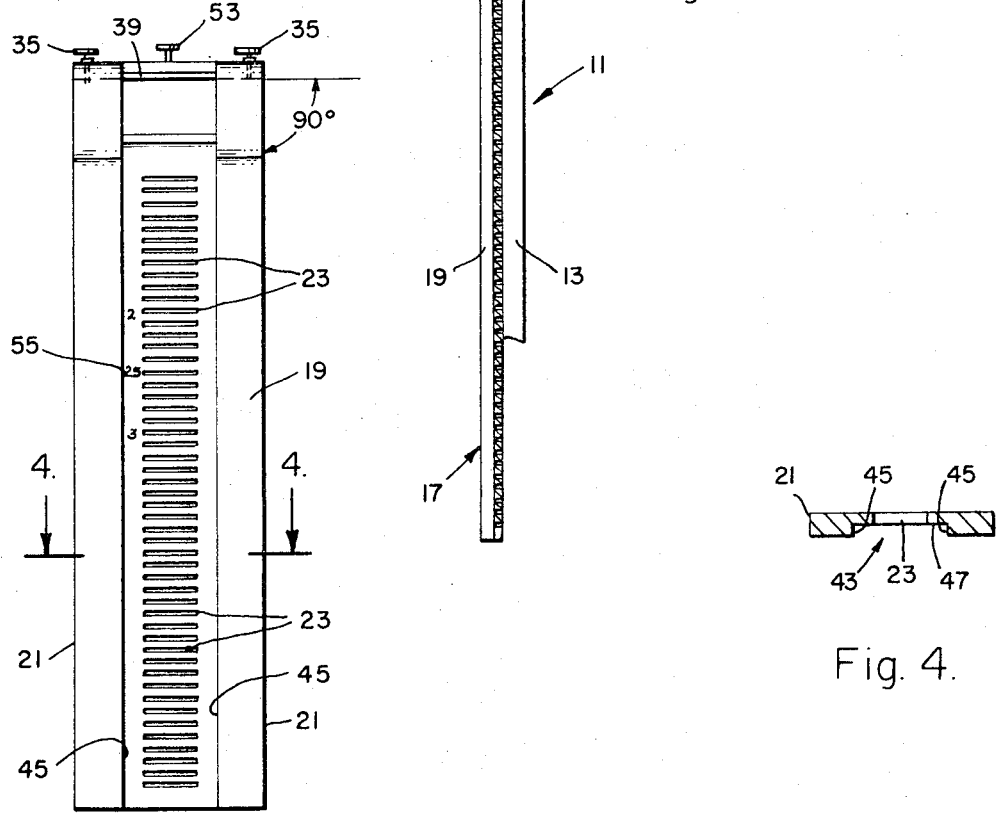

LAYEROUT GAUGE

BACKGROUND OF THE INVENTION

The background of the invention will be set forth in two parts.

FIELD OF THE INVENTION

The present invention pertains generally to the field of tools, and more particularly to gauges used by layerouters working with structural beams and the like.

DESCRIPTION OF THE PRIOR ART

Layout work on structural steel members involves the marking of shear lines for cutting beams to a desired length and marking the center of holes to be provided in the web and flanges of a beam to receive rivets and bolts in the building construction process. This task is complicated by the fact that beams have different weights and sizes and variations in these categories due to such factors as lack of good quality control. Accordingly, web and flange dimensions may vary, even for a given specified standard size or weight beam, and the layerouter must be able to still provide consistently accurate measurements so that the beams may be easily assembled in the building structure.

In order to provide accurate work, dimensions are measured from certain standard points on the beam which do not vary. Thus, the lengths of the beam and points anywhere along the longitudinal dimension thereof are measured from only one end of the beam. Likewise, all dimensions across a beam's web are measured from the outer surface of one of its flanges, and positions across the outer face of the flanges are measured from either side of the center of the web thickness.

In the past, such work has been accomplished by the use of calipers and other simple, usually handmade, tools which proved to be inconsistent in accuracy and difficult to hold in place while marking. Later, simple U-shaped tools were developed for measuring distances across the web of a structural beam, measuring from the outside face of the beam flanges. This tool had no width dimension parallel to the length of the beam and could all too readily be disposed at an angle other than perpendicularly across the beam, and resulted in errors in marking. Also, these devices provided no means for compensating for wear, accidental stretching, etc., and were thus unreliable and fragile.

The prior art also includes specialized beam gauges which could only efficiently perform a single function. For example, one such tool included a frame supporting a movable scale bar with a straight edge disposed transversally thereto, the bar having a pair of rollers which traveled on the beam's web whereby the center of the beam web could be scribed. However, this type of device had no provision for accurately setting out marks or positions at a desired distance from an end of a beam. Constructions of this type have been flimsy, tending to be easily bent and misaligned, and therefore inaccurate.

Yet other devices in the art designed for layout work are more elaborate, some including calibrated wheels and arms with vise-like jaws and center line indicating arms therebetween and which provide measurements of the flanges of beams. Also in this category are template-holding tools with complicated frame structures which span the flanges of a beam and hold selected templates over the web of the beam, a different template being required for every different hole pattern needed in the beam.

SUMMARY OF THE INVENTION

In view of the foregoing factors and conditions characteristic of the prior art, it is a primary object of the present invention to provide a new and improved construction beam layout gauge not subject to the disadvantages enumerated above.

It is another object of the present invention to provide a durable, rugged, and compact layout gauge for use in locating shear lines and centers of holes to be made in flanges and webs of a structural member, such as H-beams, I-beams, and the like.

It is still another object of the present invention to provide a low-cost highly efficient and lightweight layout gauge which is simple, yet readily adjustable for use with beams of various sizes and weights.

It is also another object of the present invention to provide a layout gauge which permits hole center marking on both the flange and web of a structural beam without movement of the tool.

It is still a further object of the present invention to provide a layout gauge which is rapid in operation and which is readily compensatable for wear and rough usage.

According to the present invention, a layout gauge for laying out structural steel beams and the like includes a unitary broad strip frame member having a web portion with parallel side edges and carrying a plurality of parallel spaced relatively narrow web gauge slots perpendicular to the side edges, the flange portion being adapted to lie flat adjacent the web of a structural beam. The frame also has an elongate U-shaped flange portion adapted to fit over but not touch a flange of a structural beam. An inner arm of the flange portion extends essentially orthogonally from an end of the web portion and an outer arm thereof is essentially parallel to an outer surface of a flange of a structural beam and parallel to the inner arm of the flange portion, but extending beyond the web portion by a distance approximately the length of the inner arm. The outer arm also has a relatively wide elongate flange opening centrally along a major portion of the length thereof. The gauge also includes means for holding the side edges of the web portion orthogonal or perpendicular to the longitudinal dimension of the outer flange surface of a structural beam. Further, a movable flange gauge strip is included which has a plurality of parallel spaced, relatively narrow flange gauge slots perpendicular to the longitudinal axis thereof, the flange gauge strip being slidably mounted on the outer arm of the flange gauge slots adjacent the elongate opening.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like components in the several views.

BRIEF DESCRIPTION OF THE DRAWING

FIG. 1 is a side elevational view of a presently preferred embodiment of the invention;

FIG. 2 is a top view of the gauge seen in FIG. 1;

FIG. 3 is an end view of the gauge of FIG. 1; and

FIG. 4 is a sectional view taken along line 4—4 in FIG. 2.

DESCRIPTION OF THE INVENTION

Referring now to the drawing, and more particularly to FIGS. 1-3, there is shown a layout gauge for laying out structural steel beams and the like, constructed in accordance with a presently preferred embodiment of the present invention. The gauge may be used with any structural beam having a web and flanges and is herein identified by reference numeral II in FIG. 1. The beam 11 thus includes a web 13 and flanges 15, only one being shown for the sake of simplicity. The gauge includes a unitary constructed broad faced strip frame member 17 having a web portion 19 with parallel side edges 21 and carrying a plurality of parallel spaced and relatively narrow web gauged slots 23 perpendicular to the side edges 21. It can be seen that the web portion 19 is adapted to lie flat against or immediately adjacent the web 13, and also has an elongate U-shaped flange portion 25 adapted to fit over but not touch the flange 15. An inner arm 27 of the flange portion 25 extends essentially orthogonally from an end of the web portion 19, and an outer arm 29 thereof being essentially parallel to an outer surface 31 of the flange 15 and parallel to the inner arm 27, but extending beyond the web portion 19 by a distance approximately the length of the inner arm 27. The outer arm 29 has a relatively wide elongate flange opening 33 essentially along a major portion of the length thereof.

Adjustable means, such as finger operated selectively movable set screws 35 mounted adjacent the edges 37 of the outer arm 29, are provided for holding the side edges 21 of the web portion 19 perpendicular or orthogonal to the longitudinal dimension or axis of the outer flange surface 31 of the beam. Slidably mounted on the outer arm 29 of the flange portion is a movable flange gauge strip 39 having a plurality of parallel spaced and relatively narrow flange gauge slots 41 which are perpendicular to the longitudinal axis of the strip 39 and located adjacent the elongate opening 33.

Preferably, the gauge frame member 17 is fabricated using an extrusion process wherein a broad channel 43 with sides 45 and lower surface 47 is provided along the entire length of the member 17 (see FIG. 4). As can be seen in FIGS. 1 and 2, the web gauge slots 23 are milled, cut or otherwise provided in the relatively thin-walled lower surface 47 for ease of accurately marking a beam's web with a scribe or thin line soapstone, for example.

In the outer arm 29 of the flange portion 25, the channel 43 houses the flange gauge strip 39 which is slidably retained therein by transverse straps 49 and 51. A finger operated set screw 53 is mounted in the upper strap 49 to to engage and temporarily hold the strip 39 at a desired position, as will later be described in more detail.

In using the tool to lay out a beam 11, for example, the beam is usually positioned with its web parallel to the horizontal and a conventional tape measure is first laid along the length of the beam on its web, starting from the work point at one end thereof. The layout gauge is then placed adjacent the beam with its flange portion 25 over a flange edge and its web portion 19 against the upper surface of the beam's web 13, as illustrated in FIG. 1, for example. Following the specifications for laying out the beam, the layer outer will note the distance for the holes to be laid out closest to the work point. He then slides the tool until one of the side edges 21 (preset to be 90° with respect to the longitudinal axis of the beam by equal adjustment of each of the set screws 35) coincides with the desired tape measure indicium, lying directly under the web portion 19. A scribe, thin line soapstone or other marking instrument is then moved across the web in sliding contact with the same straight edge 21, and the scribe placed in a web gauge slot 23 marked with an indicium 55 indicating a desired distance from the flange's outer surface 31. Each one or alternate ones of the slots 23 may be provided with appropriate indicium 55, and the accuracy of these web slot positions may be assured over extended periods of even rough usage by the sue of the adjustment set screws 35 (while maintaining the 90° straight edge relationship noted previously.) Without again necessitating the movement of the gauge, the beam flange 15 may be laid out by moving the scribe, etc. along a particular flange gauge slot 41 having an indicium 57 of a distance-from-web-center. It will be seen in FIG. 3 that the flange gauge strip 39 is marked with an index line 59. Prior to the use of the gauge on any beam, the beam's web thickness is known by its weight, size and manufacturing specifications and the strip 39 moved in the channel 43 until the index 59 registers with a web-thickness indicium 61 equal to one-half the known thickness of the web. Thus, if the web is one half inch thick, the set screw 53 is backed off and the strip 39 moved until the index 59 registers with the web thickness indicium 61 indicating one fourth inch. The set screw is again tightened and from then on the slot opposite the index 59 is positioned at the center of the beam web's width and each slot 41, on either side of this line, is known to be at an exact distance from such a point, as indicated by flange distance indicia 57.

Once all appropriate marks are laid out for one position of the gauge, it is again moved to a point along the beam where a next set of markings are to be made as indicated by the tape measure. Thus it should be obvious that the invention provides, in a rugged, simple and fast-to-fabricate and operate, low cost and highly accurate beam layout gauge, all the 90° lines, the gauges in the web and the flanges, for all the holes and parts to be installed and the shear lines for cut-off, etc.

The layout gauge described above may be fabricated from any material generally considered suitable in the trade for this type instrument, such as steel, aluminum, and the like. It should thus be understood that the materials used in fabricating the various parts and elements of the invention are not critical. It should also be understood that the foregoing disclosure and drawing is to be considered only as an illustration of the principles of the invention.

What is claimed is:

1. A layout gauge for laying out structural steel beams and the like, comprising:

a unitary broad strip frame member having a web portion with parallel side edges and carrying a plurality of parallel spaced relatively narrow web gauge slots perpendicular to said side edges, said flange portion being adapted to lie flat adjacent the web of a structural beam, said frame also having an elongate U-shaped flange portion adapted to fit over but not touch a flange of a structural beam, an inner arm of said flange portion extending essentially orthogonally from an end of said web portion and an outer arm thereof being essentially parallel to an outer surface of a flange of a structural beam and parallel to said inner arm but extending beyond said web portion by a distance approximately the length of said inner arm, said outer arm having a relatively wide elongate flange opening centrally along a major portion of the length thereof;

means for holding said side edges orthogonal to the longitudinal dimension of the outer flange surface of a structural beam; and a movable flange gauge strip having a plurality of parallel spaced relatively narrow flange gauge slots perpendicular to the longitudinal axis thereof, said flange gauge strip being slidably mounted on said outer arm with said flange gauge slots adjacent said elongate opening.

2. A layout gauge according to claim 1, including means mounted on said outer arm of said flange portion for adjustably maintaining said web gauge slots at a predetermined distance from an outer surface of a structural beam flange.

3. A layout gauge according to claim 1, including adjustment means mounted on said outer arm of said flange portion for temporarily locking said flange gauge strip at a desired position relative to said outer arm.

4. A layout gauge according to claim 1, wherein said outer arm includes a calibrated scale relative to structural beam web width.

5. A layout gauge according to claim 3, including calibrated flange scale means associated with said outer arm and said movable flange gauge strip for centering said flange gauge slots with respect to the center of the thickness dimension of a structural beam web.

6. A layout gauge according to claim 1, wherein said web portion of said broad strip frame member includes a relatively broad elongate channel extending the length thereof, and wherein said web gauge slots are disposed in the remaining relatively thin portion of said web portion.

7. A layout gauge according to claim 1, wherein said broad strip frame member is fabricated in an extruding process with a relatively broad elongate channel disposed on the outer surface and along the entire length thereof, and wherein said web gauge slots and said elongate flange opening are disposed in the relatively thin bottom portion of said channel.

8. A layout gauge according to claim 1, wherein said web portion includes web distance indicia adjacent said web gauge slots indicating distances of said web slots from the outer surface of a structural beam flange.

* * * * *